United States Patent [19]

Deal et al.

[11] 4,198,167
[45] Apr. 15, 1980

[54] AUTOMATIC TEMPURA BATTER MIXER

[75] Inventors: Douglas O. Deal; Michael E. Miller, both of Bellevue, Ohio

[73] Assignee: Sam Stein Associates Inc., Sandusky, Ohio

[21] Appl. No.: 25,668

[22] Filed: Mar. 30, 1979

[51] Int. Cl.[2] .................. B01F 15/04; B01F 9/22; B01F 7/30

[52] U.S. Cl. .................. 366/152; 366/153; 366/162; 366/184; 366/288; 366/309

[58] Field of Search .............. 366/152, 153, 154, 160, 366/162, 184, 287, 288, 309, 311, 312, 279

[56] References Cited

U.S. PATENT DOCUMENTS

| | | | |
|---|---|---|---|
| 3,041,049 | 6/1962 | Tomiji | 366/152 |
| 3,224,738 | 12/1965 | Tomiji | 366/152 |
| 3,423,238 | 1/1969 | Weiland | 366/153 |
| 3,495,808 | 2/1970 | Klein | 366/152 |
| 4,132,484 | 1/1979 | Kimmel | 366/288 |

*Primary Examiner*—Robert W. Jenkins
*Attorney, Agent, or Firm*—Baldwin, Egan, Walling & Fetzer

[57] ABSTRACT

The apparatus of this invention provides a mixing pot, open at the top, into which are simultaneously discharged a measured amount of water and a measured amount of a finely divided dry mix of leavened batter forming material, herein called a batch. This introduction of a batch takes place quickly in about thirty to sixty seconds. At the same time a specially designed mixer cage is suspended in the mixing pot and rotated and orbited around the pot in a manner to agitate thoroughly all the contents. The completed batter is then quickly propelled mechanically to batter applicator apparatus.

14 Claims, 17 Drawing Figures

AUTOMATIC TEMPURA BATTER MIXER

BACKGROUND OF THE INVENTION

1. Field

This invention is in the field of the preparation of farinaceous batter by treatment by aquaceous material using a stirrer within a stationary mixing chamber with the stirrer rotating and orbiting.

2. Prior Art

In the field of large scale food preparation and packing, one of the problem areas has been the preparation of Tempura style batter, which is used to coat certain food portions prior to their being deep fat fried. Such food portions include seafood pieces, onion and other vegetable pieces, and poultry parts. "Tempura batter," or "tempura," are the names used in the food preparation trade to describe a thick leavened batter that swells in volume during frying.

Present practice for mixing tempura batter has taken two main forms. A first form takes advantage of the fact that the dry mix formulation is available in fifty pound paper bags, which fixes the dry mix batch size as an integral multiple of fifty pounds. The mixer used may be either a ribbon/paddle blender with horizontal paddle shaft, or a multiple speed commercial mixer with a vertical rotating mixing shaft which orbits around a vertical center line while the shaft also rotates. A wire whip affixed to the shaft is usually used to blend the components. In practice, the mixer operator adds one or two bags of dry mix to the mixer, adds water by reading a meter or weighing the water on a scale, then operates the mixer for a prescribed length of time at one or more prescribed speeds. The batch of tempura is then manually transferred to the tempura applicator which coats the food products.

A tempura applicator is usually comprised of an endless open mesh wire conveyor belt with a product carrying run that dips into a pool of tempura batter, dwells there for a few seconds, then rises from the pool and discharges the product over a pulley equivalent into a deep fat fryer. A second upper conveyor belt has a lower run of the same wire belt which closely follows the product run of the lower belt, to force product pieces below the surface of the pool.

A second form of mixer consists of a continuous mixing tank with a rotating vertical paddle shaft concentric with the vertical center line of mixing tank, an associated dry mix hopper with screw conveyor means to add dry mix to the mixing tank, and a variable water metering device to add water to the mix. The mixing tank is located relative to the tempura batter applicator so that the operating level in the mixing tank is somewhat higher than that in the tempura applicator. An outlet at the bottom of the mixing tank is piped to a point above the operating level in the applicator so that gravity may cause batter to flow from the mixer to the applicator when operating levels are correct, but no reverse flow is possible.

In practice, the dry mix hopper is filled by emptying a number of fifty pound bags into it. The dry mix feed screw and the water metering device are set to deliver the mix proportions required and the machine is started. As the water and dry mix pass through the mixing tank, they are essentially blended. The addition of components continues as the level in the mixing tank rises. When the mixing tank reaches operating level, mixed batter starts to discharge into the tempura applicator due to the difference in operating levels. This discharge continues until the batter applicator is filled to operating level, at which time a level sensor in the applicator shuts off dry mix feed and water feed, and may shut off the mixer paddles too. Additional transfer to the applicator and mixing of additional batter is now governed by the level sensor in the applicator.

Both of these mixing methods include disadvantages that are a continual aggravation to the food processor. In the batch mixing method, the mixer operator is responsible for accurately weighing or metering each batch of water, and for accurately timing each mixing cycle. Thus the operator may err in at least two measurements for each batch, and possibly three measurements if two mixer speeds are required, as they usually are. The operator must also manaully transfer up to thirty-seven hundred pounds of water and mixed batter per hour. A further disadvantage of this method is that the mixing cycle starts with the dry mix and water not blended, so that mixing paddles pass through one component and then the other until some initial blending has taken place. This is the reason that two mixer speeds are usually used, a first slow speed for a period of time to blend, and then a higher speed for a time to fully mix.

These mixing periods may total or even exceed the allowable mixing time before the mix begins to degrade by losing gases. A last disadvantage of this batch mixing method is that the level of batter in the applicator varies drastically by the size of the mixed batch. The variation in applicator level affects the dwell time of product in the batter because product enters the batter on a downsloping belt and leaves the batter on an upsloping belt. Therefore, as the batter level in the applicator drops, the product enters the batter later and leaves sooner. Variation in dwell time results in variation in coating, especially when product pieces being coated are frozen as with fish portions.

The disadvantages of the continuous mixing method are less obvious. The dry mix feed accuracy is based upon the assumption that the dry mix will feed at a constant rate depending upon screw speed. In practice, the amount of dry mix in the dry mix hopper affects the compaction of the mix in the screw, so that a given screw speed will deliver more from a full hopper than from a nearly empty hopper. In addition, the moisture content of the dry mix also affects the compaction in the screw. The combination of these means that the screw may deliver either loosely or more densely compacted chunks of dry mix to the mixer, and that the rate of delivery is continually changing as the hopper level varies and as new bags of dry mix are added to the hopper. In turn, this means that the mixed batter transferred to the applicator is continually changing. A further disadvantage of the continual mixing system is that at the end of the shift, the mixing chamber is full of mixed batter, which is usually discarded because it cannot be transferred. Another disadvantage to continuous mixing of tempura is that the method is not adaptable when solid shortening must be mixed into the tempura. Solid shortening is virtually impossible to meter, and the mixing speeds used are too low to blend solid shortening into the batter. This method is less labor intensive than the first method, and also produces a nearly constant operating level in the applicator.

Tempura is a mixture of water, and dry solids in finely divided form, sometimes also containing liquid or solid shortening. The dry solids component is a formulation of wheat and/or corn flours, egg and/or milk solids, gums, spices and flavorings, and leavening. Usually the tempura is mixed in a ratio by weight of approximately one water to one dry mix, but a particular product may require more or less water.

At the present time, there are individual food processing lines in use which require the accurate mixing of 2,500 pounds per hour of tempura batter. If the batter is not accurately mixed, the final product will vary in appearance, weight and taste. The problem is further complicated because tempura is subject to some degradation after two minutes mixing, and degradation becomes increasingly severe after about three minutes. Degradation occurs because the leavening reacts with water to form small gas bubbles and prolonged agitation causes the gas bubbles to leave the tempura. Once the gas bubbles have been removed from the tempura batter, the batter will not swell as desired during frying. An associated complication is that if tempura is allowed to stand for long periods of time before use, very little agitation will remove all gases. This combination of required mixing accuracy, short mixing time and relatively short holding time means that tempura must be mixed quickly in relatively small quantities, and must then be used relatively quickly.

The present invention is a tempura batter mixer which eliminates all of the disadvantages of the previously discussed mixing methods, and incorporates all of the advantages, while having some features not available in either. A vertical mixing tank is fitted with a vertical shaft mixing cage which can rotate at an infinitely variable speed, and at the same time the entire mixing cage can orbit at an independently and infinitely variable speed' about the vertical center line of the mixing tank. A dry mix hopper is provided with a moving belt bottom so that dry mix can be fed to the mixing tank in non-compacted or fluffy state, at any speed desired. A water holding tank is provided, equipped with automatic filling, adjustable volume/weight control, and emptying means. Both the dry mix batch (of either 50 or 100 pounds) and the amount of water to mix it with can be delivered, by this invention, to the mixing pot in about thirty seconds. A low agitation transfer pump is provided, infinitely variable in speed, for moving mixed batter to the batter applicator on demand. Once controls are set, the operator is only responsible for filling the dry mix hopper and pushing one button.

It may be seen that one object of the invention is to eliminate operator error in water measure and mixing time. Another object is to ensure that dry mix and water are added to the mixer in a way that minimizes separation and speeds blending. Another object is to reduce mixing time to a bare minimum consistent with adequate mixing. Another object is to maintain batter applicator level nearly constant. An overriding object is to ensure that all batches are proportioned and mixed in the same way for the same time.

DESCRIPTION OF PREFERRED EMBODIMENTS

Figure 1:
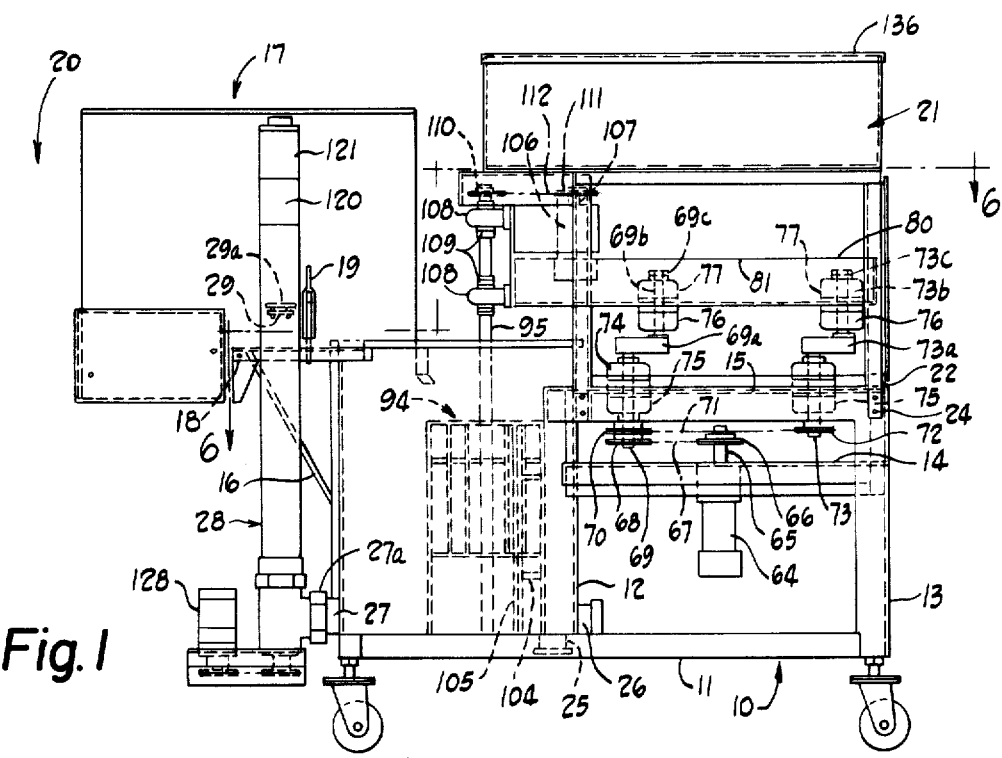
FIG. 1 is a side elevation of the complete tempura batter mixer.
Figure 2:
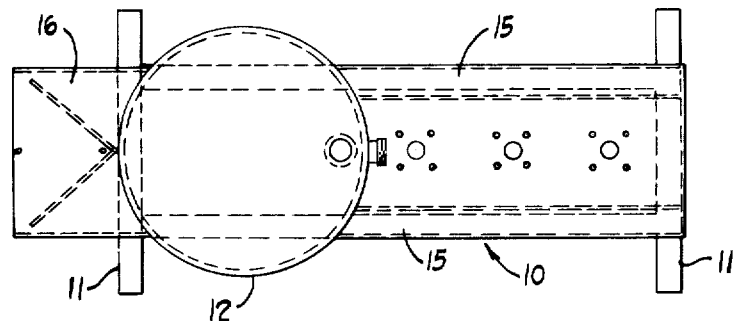
FIGS. 2 and 3 are top plan views and side elevational views, respectively of the frame in FIG. 1.
Figure 3:
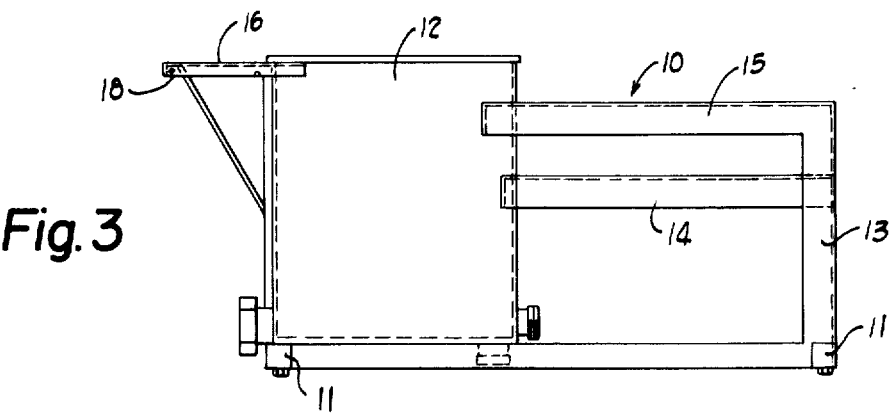

Referring to FIGS. 1, 2 and 3, the frame 10 includes base members 11, mixing pot 12, vertical frame members 13, motor-mounting plate 14, bearing plate 15 and hopper mounting bracket 16. The dry mix hopper assembly 17 is pivotally mounted at 18 to the hopper mounting bracket 16, and is held in operating position as shown by one hook-type over-center clamp 19 on each side of the hopper assembly 17. During cleaning of the machine, the hopper assembly 17 may be rotated counter-clockwise as indicated by arrow 20 approximately 45 degrees about pivot mount 18, after first loosening clamps 19.

Mounted above the moving parts of the machine is the control box assembly 21, with control box cover 136. Four tubular legs 22 attached to the control box bottom 23 extend downwardly and are bolted to the sides of bearing plate 15 at location 24. The mixing pot 12 is equipped with three outlet fittings of sanitary construction. A bottom fitting 25 is for use as a drain during cleanup and is a male threaded ferrule equipped with sanitary nut and end cap. An identical side fitting 26 is also equipped with a sanitary nut and end cap. Fitting 26 is for future connection as a pump suction if and when the machine is ever used as a mixer for standard batters. Fitting 27 is a sanitary ferrule equipped with captive attachement nut 27a of three inch nominal size. It provides the suction connection for the batter transfer assembly 28. A bracket 29 on the transfer assembly 28 removably mates with a bracket latch 29a fastened to the side of the hopper assembly 17 to stabilize the transfer assembly 28 during use, yet permit removal of assembly 28 during cleaning.

Figures 4, 5:
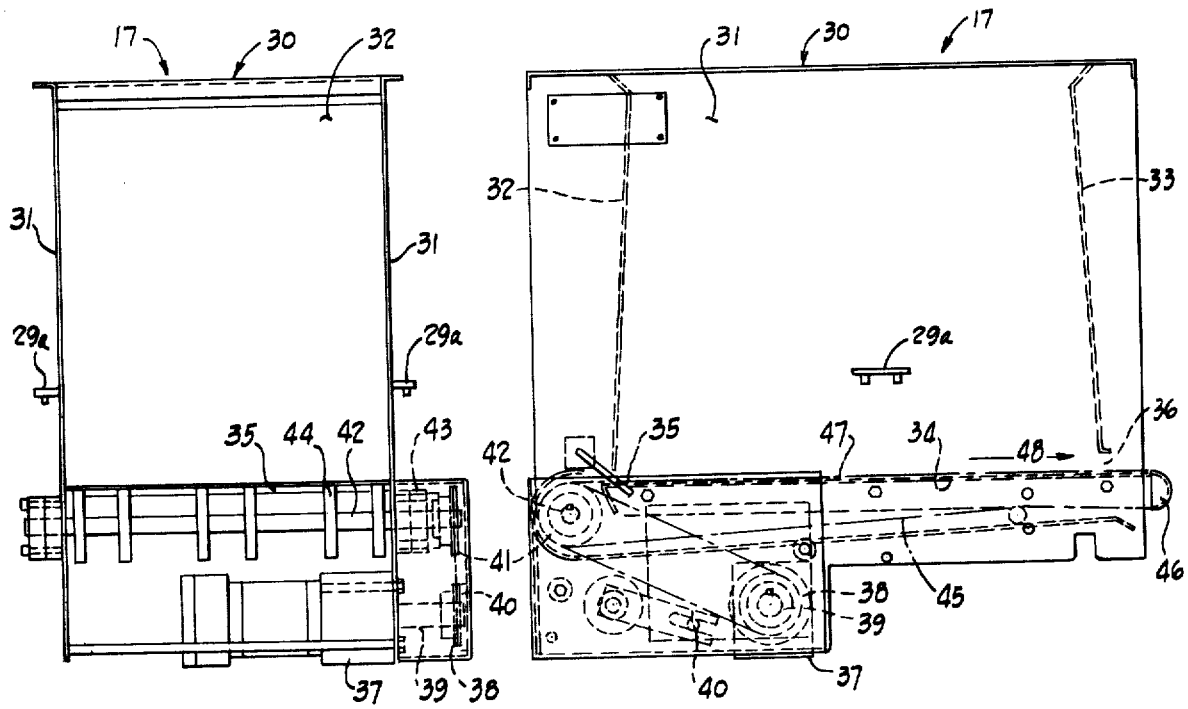
FIG. 4 is a side elevation of the dry mix hopper assembly in larger scale, showing more details of construction.
FIG. 5 is a left end elevation of the hopper of FIG. 4.

Referring now to FIGS. 4 and 5, the construction and function of the dry mix hopper assembly 17 may be understood. The hopper 30 is formed by two side walls 31, an inlet end wall 32 an outlet end wall 33 and a bottom wall 34 partway above the bottom edges of side walls 31. The bottom edge of the inlet end wall 32 terminates at 35 about three-eights of an inch above the bottom wall 34, while the bottom edge of the outlet end wall 33 terminates at 36 about one inch above the bottom wall 34. A hydraulically powered dry mix motor 37 is mounted in one side wall 31 below the bottom wall 34, equipped with a rigidly mounted roller chain sprocket 38 on motor shaft 39. A roller chain 40 connects sprocket 38 with another sprocket 41 rigidly mounted on belt drive shaft 42, with shaft 42 carried in bearings 43 which are also mounted on side walls 31. Drive shaft 42 is fitted with a multiplicity of belt drive sprockets 44, fixed on the shaft 42 so as to drive belt 45. Belt 45, in the preferred configuration of this invention, is an open mesh wire belt known by the trade name of Flat-Flex, made by the Wire Belt Company of America. A discharge nose piece 46 is mounted at the discharge end of the bottom wall 34 in place of a second conveyor belt shaft. The nose piece 46 is fabricated from nylon and has a semicircular cross section so that the belt 45 may slide freely around its 180 degree arcuate surface. This construction is used, rather than a discharge pulley equivalent, to ensure that all dry material is carried over the end of nose piece 46, rather than falling through the open mesh wire belt 45 before it reaches a pulley equivalent, as the dry material would do if a pulley equivalent were used. The belt 45 is endless, and passes from the top of the belt drive sprockets 44, through the slot at 35 under end wall 32, across the top surface of bottom wall 34, through the slot at 36 under end wall 33, over the nose piece 46. The belt 45 turns down 180 degrees around nose piece 46 to return under the bottom wall 34 to the underside of drive sprockets 44. It may now be seen that when dry mix motor 37 turns in a clockwise direction in FIG. 4, that the upper run 47 of belt 45 will move in the direction of arrow 48, carrying material from the hopper 30 with the belt 45 through the slot at 36, to discharge over nose piece 46 into pot 12. The time required to empty the hopper 30 with a given initial load, and a fixed slot configuration at 36, is solely a function of belt speed.

Figure 6:
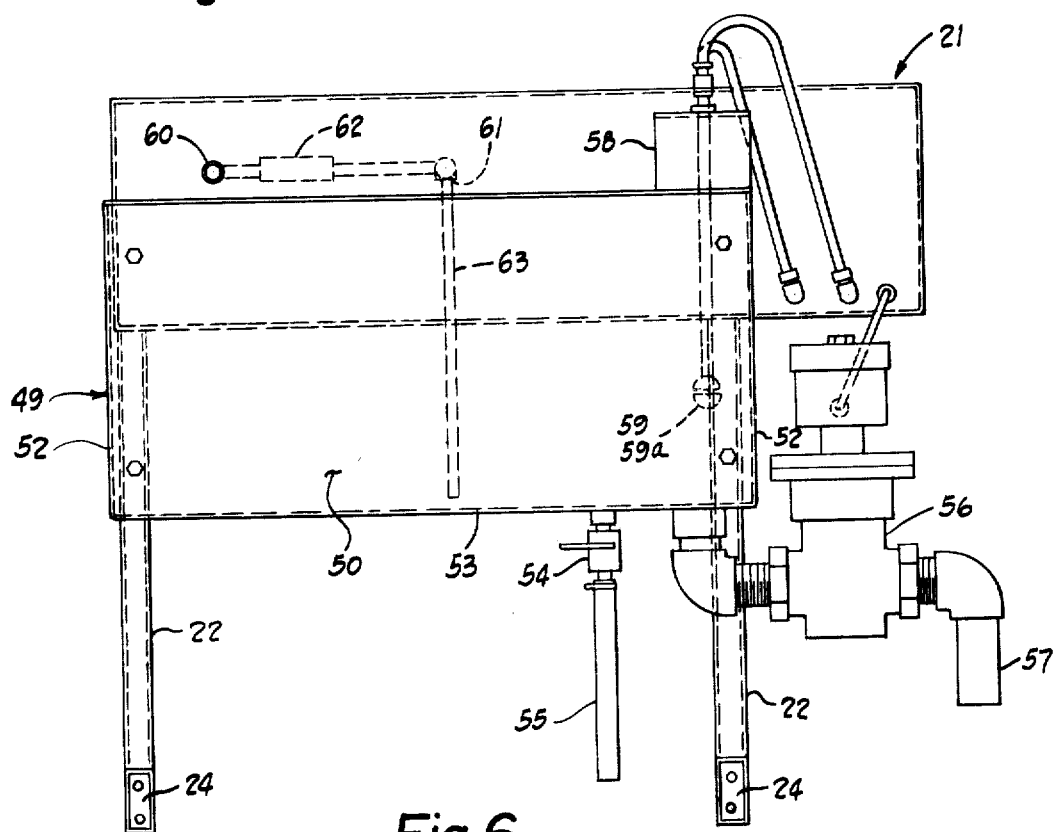
FIG. 6 is a side elevation of the water tank and control box assembly, taken from the side of the machine opposite the side shown in FIG. 1.
Figure 7:
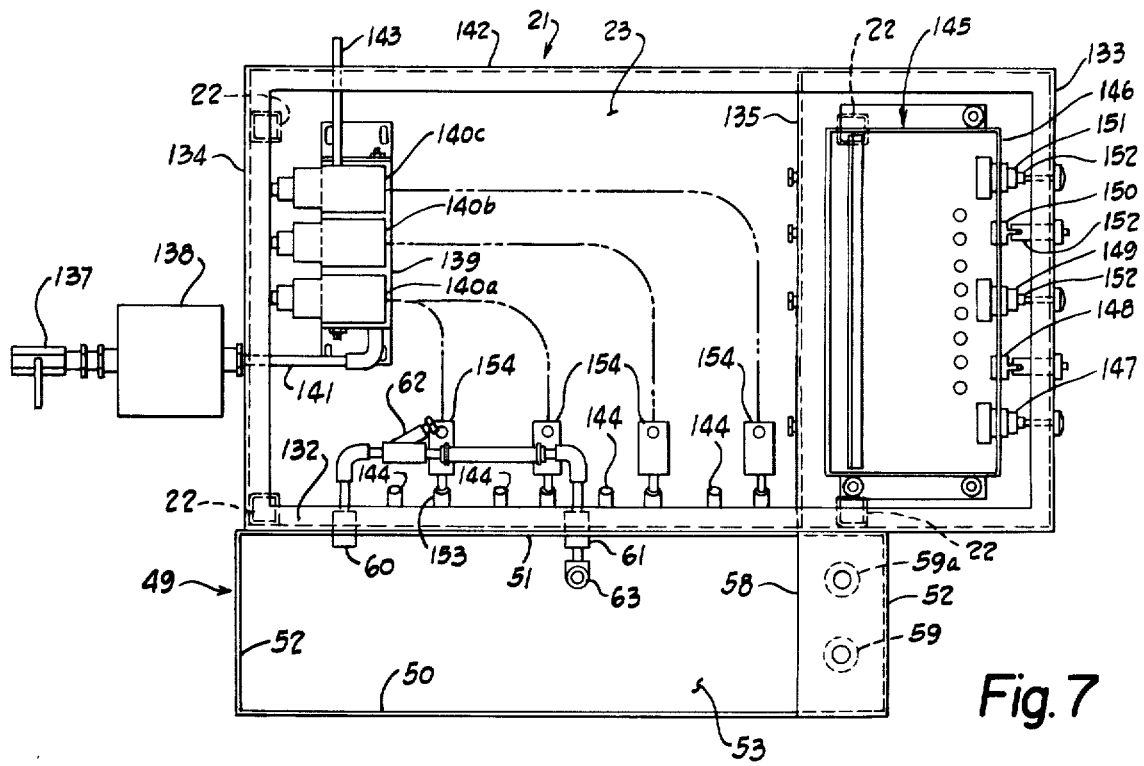
FIG. 7 is a top plan view of the water tank and control box of FIG. 6.

Referring now to FIGS. 6 and 7, construction and function of the water tank will be understood. The water tank 49 is formed by a side wall 50, a side wall 51, two end walls 52 and a bottom wall 53. The entire water tank 49 is bolted to the side of the control box 21 by bolts through the side wall 51 and the side wall 132 of the control box 21. The bottom wall 53 is fitted with a manual drain valve 54 and drain tube 55, for emptying after operation. The bottom wall 53 is also fitted with a solenoid operated dump valve 56 with its associated pipe fittings. When properly energized, valve 56 will discharge water through outlet nipple 57 into the mixing pot 12 not shown in these figures. At one end of the tank 49 is a bracket 58 carrying two float assemblies 59 and 59a each of which may be fixed independently at any desired water level in the tank, and either float may be used to limit the water level in this tank at any point. Their exact operation will be described later. Just above the top of the water tank 49, two female pipe fittings 60 and 61 are welded into side wall 132 of control box 21. Inside control box 21, the two fittings 60 and 61 are piped together with a solenoid valve 62 between them. Outside the control box, a water discharge tube 63 leads from fitting 61 down into tank 49. It may be seen that if a water supply line is attached to fitting 60, water can not flow through fitting 61 and tube 63 into tank 49 unless solenoid valve 62 is properly energized to the open position.

Figure 11:
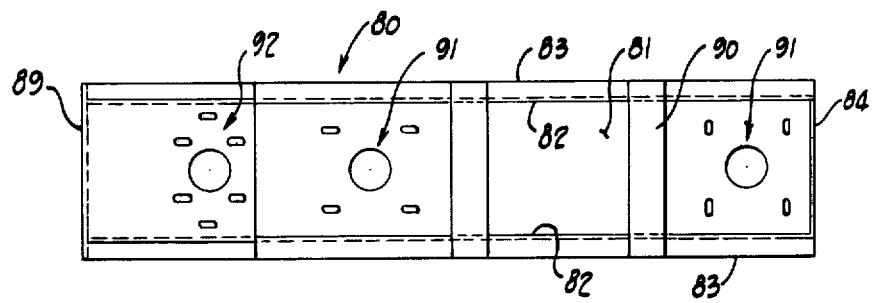
FIG. 11 is a top view of the ram of FIG. 10.
Figures 10, 12:
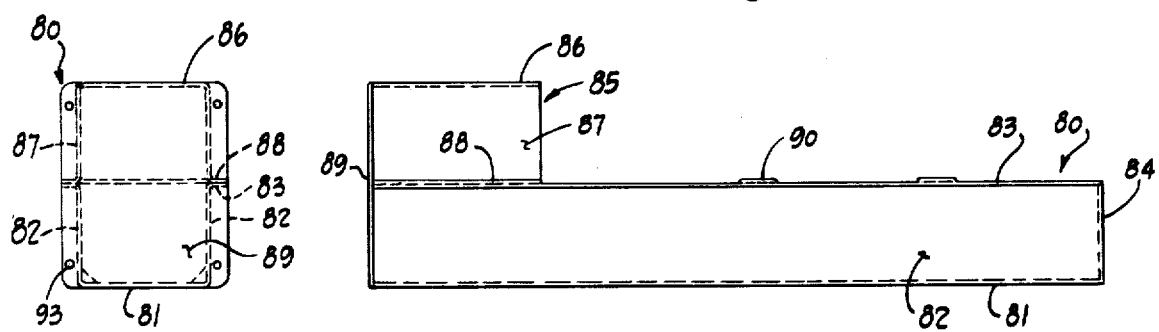
FIG. 10 is a side elevation of the ram which is part of the mixing mechanism.
FIG. 12 is a left hand end elevation of the ram in FIG. 10.

Referring to FIGS. 10, 11 and 12, the construction of the mixer ram 80 may be seen in detail. An open top channel shape is formed from sheet metal so that the channel has a bottom wall 81 and two side walls 82 with upper flanges 83. An end wall 84 closes one end. A portion of the other end of the ram 80 is capped by an inverted channel shape 85 with a top wall 86 and two side walls 87 with lower flanges 88. This entire end of the ram 80 is then fitted with an end wall 89. Two cross bars 90 complete the strengthening of the ram 80. The bottom wall 81 is pierced by two patterns 91 of four slots each and one larger round hole each. These hole patterns 91 are the bearing mounting locations for bearings 76, 77 seen in FIG. 1, the larger round holes being clearance holes for crank pins 69b and 73b seen in FIG. 1. The top wall 86 of the ram 80 is pierced with a pattern 92 of six slots and one larger round hole. This hole pattern 92 is the mounting location of hydraulically powered mixer drive motor 106. End wall 89 is pierced with four holes 93 which are the mounting locations for mixer cage shaft bearings 108 seen in FIG. 1. The entire ram 80, of eleven gage (0.120" thick) stainless steel, is of all continuous welded construction and is very rigid as required for its function.

Figure 13:
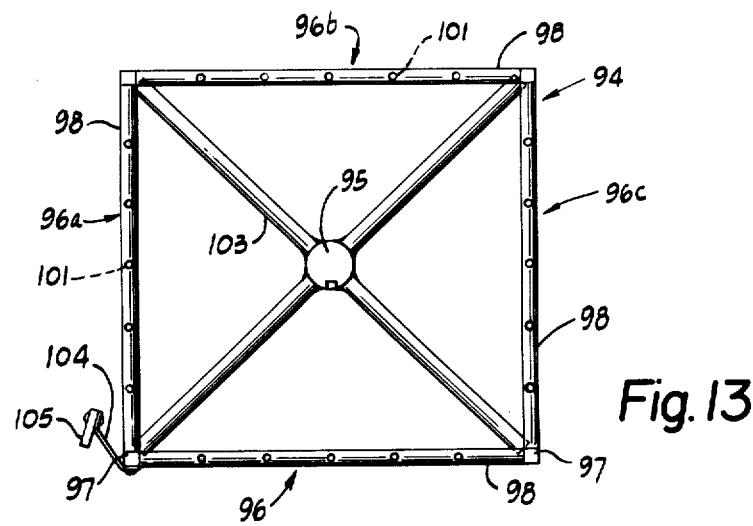
FIG. 13 is a top view of the mixing cage on a larger scale.
Figure 14:
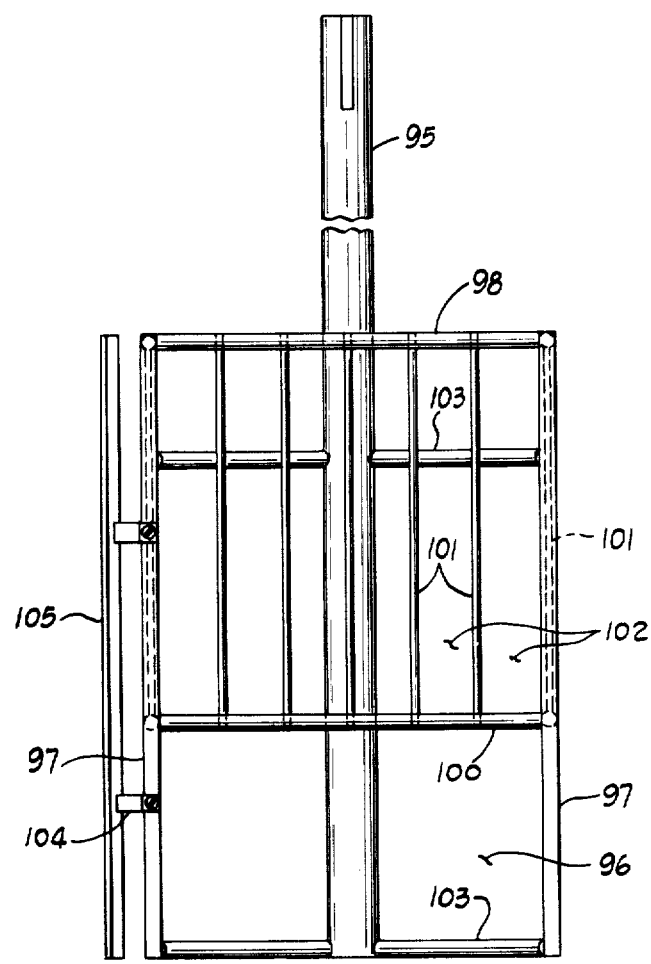
FIG. 14 is a side elevation of one face of the mixing cage in FIG. 13.

Referring now to FIGS. 13 and 14, the preferred construction of the mixer cage may be seen. The mixer cage 94 consists of a central suspension shaft 95 surrounded by four rectangular faces 96, 96a, 96b, 96c. Each face lies in a plane parallel to the center line of shaft 95, and the intersection of the four planes form right angle corners with each other. Rectangular face 96 is bounded by two corner posts 97, and a top member 98. An intermediate cross member 100 is attached at its ends to the two corner posts 97. Five vertical rods 101 are attached to top member 98 and intermediate member 100, with the six spaces 102 between rods 101, or between rods 101 and corner posts 97, being essentially equal. The other three rectangular faces 96a, 96b, 96c appear essentially the same in elevation as rectangular face 96 except for scraper blade 105 and its arm supports 104. The lower end of shaft 95 is flush with the bottoms of all corner posts 97, and eight radial arms 103 space the central shaft 95 equally from the four corner posts 97. The overall length of each corner post is sufficient to reach from the bottom of the mixing pot 12 to a point about four to six inches below the top of mixing pot 12. In each rectangular face 96, 96a, 96b, 96c the intermediate member 100 is located above the bottom of corner posts 97 a distance of about one-third the total length of a corner post 97. The central shaft 95 extends above the top of the rectangular side panels a distance sufficient to engage its driving means and support bearings, as will be described later. The thickness and width dimensions of the various cage members are not too critical, but in this configuration, the shaft 95 is one inch diameter, the corner posts 97 are three-eights of an inch square bar, the radial arms 103 and members 98, and 100 are all three-eights inch diameter round bar, and the rods 101 are three-sixteenths inch in diameter. It should be noted that the radius from the center line of shaft 95 to the furthest edge of corner posts 97 should be slightly less than about three-fourths of the inside radius of the mixing pot 12. As later noted in the discussion of FIGS. 1 and 8, the radius of the crank arms 69a and 73a is about one-fourth of the inside radius of the mixing pot. Thus the sum of the crank arm radius and the maximum mixer cage radius must always be less, about one-fourth inch, than the inside radius of the mixing pot 12. A final detail of the mixer cage should be noted. One of the corner posts 97 is fitted with two scraper support arms 104 which in turn carry a scraper blade 105. One end of each arm 104 is rigidly fastened to the corner post 97 while the other end of each arm 104 is rigidly fastened to the scraper blade 105. Each arm 104 is moderately flexible so that each time the mixer cage 94 rotates, the scraper blade may scrape a portion of the inner wall of the mixer pot 12. The flexibility of the scraper support arms 104 allows the scraper to wipe a larger portion of the pot inside than if the arms 104 are rigid. The scraper blade 105 is preferably made of synthetic material such as nylon or polyethylene, and is dimensioned to be self supporting between scraper support arms. Scraper blade dimensions in this configuration are about one-fourth inch thick, one inch wide, and about equal in length to the corner posts 97.

Figure 8:
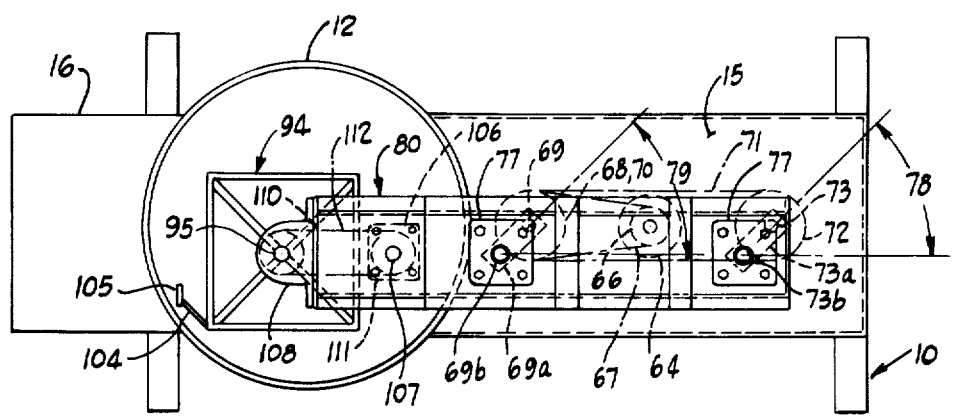
FIG. 8 is a sectional view of the machine taken on line 8—8 of FIG. 1, showing the mixer components.

Referring now to FIGS. 1 and 8, the orbital motion of the mixing cage may be understood. A hydraulically powered ram drive motor 64 is mounted under motor mounting plate 14 so that motor shaft 65 points vertically upwards through plate 14. Shaft 65 is rigidly fitted with a roller chain sprocket 66 which drives roller chain 67, which in turn drives sprocket 68 rigidly mounted on crank shaft 69. Crank shaft 69 is also rigidly fitted with sprocket 70 which drives roller chain 71, and roller chain 71 drives sprocket 72 which is adjustable mounted on crank shaft 73. Crank shafts 69 and 73 are each rotably supported by a pair of heavy bearings 74 and 75; each pair 74, 75 being bolted on opposite sides of bearing mounting plate 15, with crank shafts 69 and 73 extending through plate 15. Crank shafts 69 and 73 are rigidly fitted with identical parallel ruler crank arms 69a and 73a respectively, and identical crank pins 69b and 73b respectively. Crank pins 69b and 73b are each inserted through a pair of bearings 76 and 77; the bearings 76 and 77 being rigidly mounted in the bottom wall 81 of the ram 80. Collars 69c and 73c, rigidly fastened above bearings 76 and 77 to the top ends of crank pins 69b and 73b, serve to keep the bearings 76 and 77 from lifting off the crank pins 69b and 73b. It has been noted above that sprocket 72 is adjustably mounted on crank shaft 73. Referring to FIG. 8, it may be seen that when sprocket 72 is loosened on crank shaft 73, that crank arm 73a may be rotated in either direction until angle 78 exactly matches angle 79. When this match is obtained, sprocket 72 may be locked to crank shaft 73. Thereafter, crank shafts 69 and 73 will rotate in exact synchronization, and angles 78 and 79 will change equal amounts so that they always remain identical. The operation of the ram 80 may now be understood. As motor shaft 65 rotates, preferably in a counterclockwise direction in this configuration, it drives crank shaft 69 through sprocket 66, chain 67 and sprocket 68. As shaft 69 rotates, it drives crank shaft 73 through sprocket 70, chain 71 and sprocket 72. Each crank pin 69b and 73b describes an identical circle in a horizontal plane, so that every point on the entire ram 80 describes the same identical circle. The usable result of this is that the vertical center line of the shaft 95 of the mixer cage 94 orbits around the vertical center line of the mixing pot 12, with an orbital radius equal to the radius of crank arms 69a and 73a. It should be noted that the radius of crank arms 69a and 73a is about one-fourth of the inside radius of the mixing pot 12. This has been mentioned in the discussion of FIGS. 13 and 14, and will be further discussed later.

Continuing to refer to FIGS. 1 and 8, the entire mixing function may be understood. Mounted inside the ram 80, at hole pattern 92, is the hydraulically driven mixer cage drive motor 106. Mixer motor shaft 107 extends upwardly through the large round hole of the hole pattern 92, while bolts through the slots of hole pattern 92 hold the motor 106 in place. Mounted on the outside of ram end wall 89 are two pillow block bearings 108, with their fastening bolts passing through holes 93 in end wall 89 of ram 80. The central shaft 95 of the mixer cage 94 extends through both bearings 108, so that the mixer cage 94 can rotate freely while being supported and held in alignment by bearings 108. Clamp collars 109 are placed on the shaft 95 both above and below each bearing in order to keep the shaft 95 from sliding axially through the bearings during operation of the machine. The upper end of shaft 95 is rigidly fitted with a sprocket 110, and the motor shaft 107 is rigidly fitted with sprocket 111. Sprockets 110 and 111 are connected by roller chain 112, so that as the motor shaft 107 rotates, the mixer cage shaft 95 must also rotate. The orbital motion of the mixer shaft 95 about the vertical center line of the mixing tank has already been described, and the dimensions of the mixer cage have been described. It is now obvious that regardless of the location of the mixer shaft 95 on its orbital path, the mixer cage 94 may rotate freely without striking the mixing pot wall, except that the scraper blade 105 will sweep a portion of the mixing pot 12 with each revolution of the mixer cage 94. The direction of rotation of the ram drive motor shaft 65 and the mixer cage drive motor shaft 107 is preferred to be the same. In this configuration, rotation is counterclockwise when viewed from the top of each motor.

Figure 9:
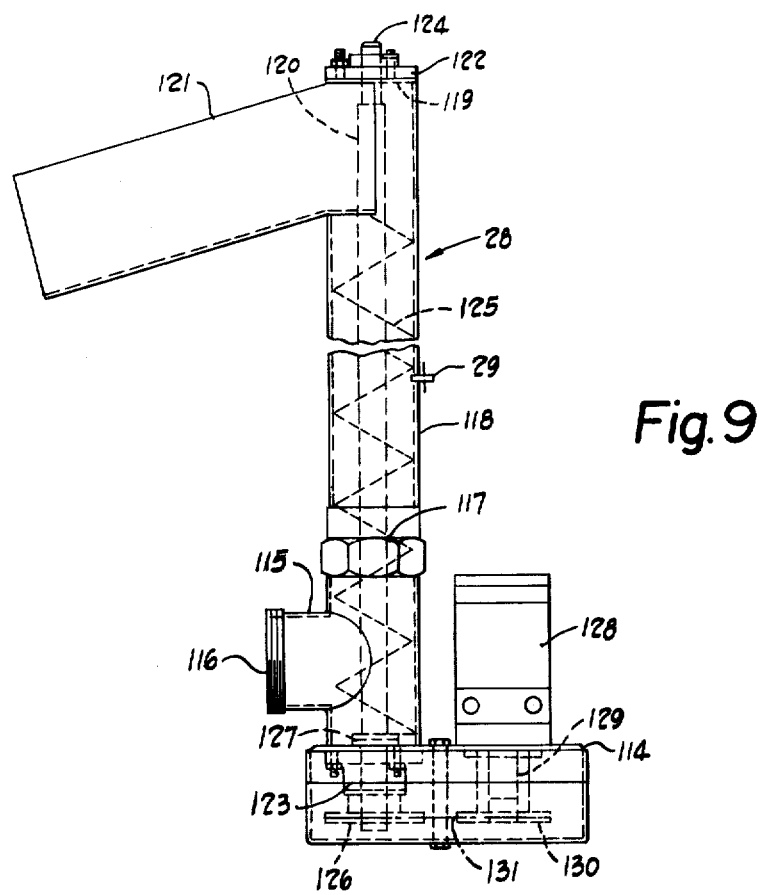
FIG. 9 is a side elevation of the batter transfer assembly in larger scale, showing more details of construction.

Referring to FIG. 9, the construction of the batter transfer assembly 28 may be seen. A base plate 114 is attached to one end of a sanitary pipe tee 115 that has a male threaded side opening 116 and a top opening 117. Removably attached to the top opening 117 is a sanitary tube 118 with a top closure plate 119. The tube 118 has a side opening at 120 near its top end, the opening 120 being the same size as the discharge chute 121. Mounted on the top closure plate 119 is a shaft bearing 122 and mounted under the base plate 114 is another shaft bearing 123. The top closure plate 119 and the base plate 114 are each pierced with holes to allow a single shaft to rotate in the two bearings 122 and 123. Mounted rotatably in the bearings 122 and 123 is the screw conveyor shaft 124 which carries integral helical flighting 125 from a point just above base plate 114 to the lower edge of tube opening 120. The tee 115 and the tube 118 are of equal inside diameter, being about three inches diameter in this configuration. The outside diameter of the helical flighting 125 is slightly less than the inside diameter of tube 118 and tee 115 so that the shaft 124 and flighting 125 may rotate freely inside tube 117 and tee 115.

The lower end of shaft 124 is rigidly fitted with a roller chain sprocket 126 below the bearing 123. Just above the base plate 114, the shaft carries a shaft seal 127 which serves to keep liquid from entering the top of bearing 123. Also mounted on the base plate 114 is a hydraulically powered transfer assembly motor 128 with its rotating shaft 129 parallel to screw shaft 124. Rigidly attached to motor shaft 129 is sprocket 130 and chain 131 connects sprocket 130 with sprocket 126 on screw shaft 124. It may be seen that when motor shaft 129 drives screw shaft 124 in the correct rotary direction, that any material inside the tube 118 will be propelled by the helical flighting 125 from the lower end of the tube 118 to the top opening at 120. This is a typical screw conveyor, but a somewhat special construction, being built to handle a thick liquid material rather than the dry granular material. The side opening 116 of the tee 115 is easily and rapidly connected to the mixing pot 12, by the captive nut 27a provided as part of fitting 27 on pot 12. The bracket 29, as previously mentioned, mates with one of the compatible bracket latches 29a attached to the sides of the hopper assembly 17, to hold the transfer assembly 28 in operating position on either side of the mixer as desired.

Refer now to FIG. 7 for a discussion of the control box 21. The box itself is of a size to contain all of the operating controls for the tempura batter mixer of this invention, except the water dump solenoid valve 56, the two level probes 158 and 159 in the batter applicator, and the two water tank float switches 59 and 59a. The control box 21 has a bottom wall 23, a side wall 132, a side wall 142, an end wall 133, and an end wall 134 and an intermediate wall 135. The control box cover 136 which shows in FIG. 1 is omitted in FIG. 7. As previously discussed for FIG. 1, the control box is supported by four tubular legs 22 attached to bottom wall 23. The legs 22 also act as drains for the control box, being inserted into holes pierced into the bottom wall 23, then being welded all around to the bottom wall 23. Thus, any liquid that inadvertently gets into the control box 21 may drain out of one of the tubular legs 22 all of which are open to the atmosphere at their lowest extremity.

Attached to end wall 134 is the main hydraulic oil supply from pump P consisting of a shut off valve 137 and a filter 138 with their associated fittings. Attached to the bottom wall 23 is an oil manifold 139 mounted with a series of three solenoid valves, valve 140a supplies oil to motors 64 and 106, 140b supplies oil to motor 37 and 140c supplies oil to motor 128. The manifold 139 is connected to the hydraulic oil supply main through pipe 141 from filter 138, and is connected to the hydraulic oil return main through pipe 143 which pierces wall 142. The bottom wall 23 is fitted with four bulkhead fittings 144 alternating in a row near wall 132 with four bulkhead fittings 153. These bulkhead fittings 144 and 153 pass through bottom wall 23, are locked to bottom wall 23, and provide threaded connections above and below wall 23, so that hydraulic hoses or other devices may be attached to either end.

Inside the control box 21 the four bulkhead fittings 153 are each fitted with a flow control valve 154. Solenoid valve 140a is piped to two flow control valves 154 as shown by dot-dash lines. These valves 154 are then respectively connected by hoses not shown to motors 64 and 106. Solenoid valve 140b is connected to a third flow control valve 154 as shown by dot-dash lines and this valve 154 is then connected by a hose not shown to motor 37. Solenoid valve 140c is connected to a fourth flow control valve 154 as shown by dot-dash lines and this valve 154 is then connected by a hose not shown to motor 128. The oil return from each motor is by a hose not shown which connects to one of the bulkhead fittings 144. All four bulkhead fittings 144 are then piped directly to the return line side of oil manifold 139 shown in dot-dash lines. It may be seen that although solenoid valve 140a will supply oil to both motors 64 and 106, the speed of the motors 64 and 106 are independently controlled by their respective flow control valves 154. Motors 37 and 128 each have independent solenoid valves 140b and 140c respectively, and independent flow control valves 154. It may now be understood that high pressure hydraulic oil may be supplied to valve 137, will pass through the valve 137 when it is open, will pass through the filter 138 for cleaning and will then pass into hydraulic oil distribution manifold 139 to be available at solenoid valves 140a, 140b and 140c. When any solenoid valve is energized and opened by the electrical controls, high pressure oil flows through a flow control valve 154, through a bulkhead fitting 153 and through a hose not shown to the proper hydraulic motor 37, 64, 106 or 128. As the motor turns at a speed governed by its flow control valve 154, oil pressure is drastically reduced to return line pressure, and the oil returns through another hydraulic hose not shown, through a bulkhead fitting 144, through piping to the oil return manifold 139 and thence to the hydraulic pressure pump suction through pipe 143.

Figure 17:
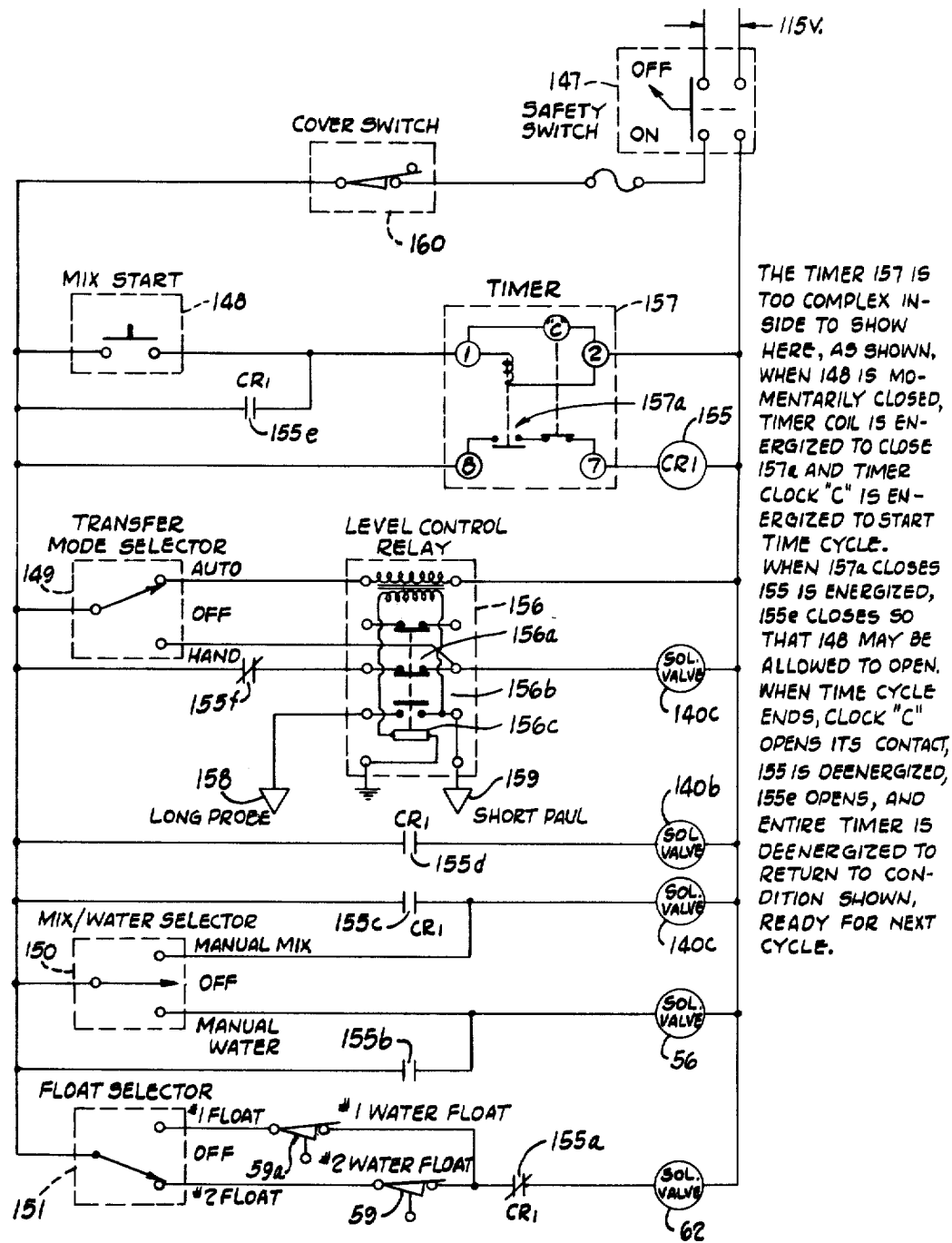
FIG. 17 is a control ladder diagram for the tempura batter mixer of this invention.

The space between end wall 133 and intermediate wall 135, which defines about one-third of the volume of control box 21, is occupied by the electrical control box 145. The electrical control box 145 is smaller in every dimension than the space it occupies in control box 21, to minimize the danger of water entering box 145. Box 145 is mounted about one inch above the inside of bottom wall 23, is clear of side walls 132 and 142 by about the same amount, is clear of end wall 133 by about two inches, and is fitted with a gasketed cover, not shown for clarity. Mounted in a side wall 146 of box 145 are the operating switches 147, 148, 149, 150, and 151 for the tempura batter mixer. Extension operators 152 for the switches 147, 148, 149, 150 and 151 are mounted in end wall 133 of control box 21. It may be seen that the electrical controls are well isolated from any possible contamination by water or oil, because all four tubular supports 22 would have to be plugged before any water or oil could reach an entry point into electrical box 145. Mounted in the electrical control box 145, but omitted for clarity in this drawing, but seen in FIG. 17, are an adjustable mixing cycle timer 157, a relay 155 for operating the five solenoid valves 56, 62, 140a, 104b, 140c and a relay 156 for the level control probes 158 and 159 located in the batter applicator. All of these components are interwired as necessary. The function of the electrical controls will be covered in the discussion of FIG. 17.

Figure 15:
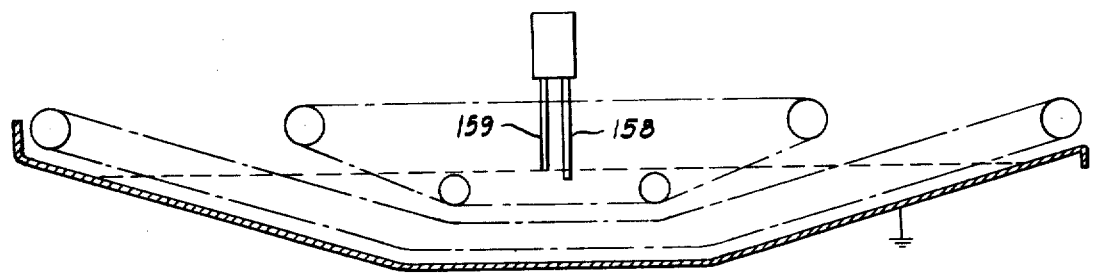
FIG. 15 shows a batter applicator for use with this invention.
Figure 16:
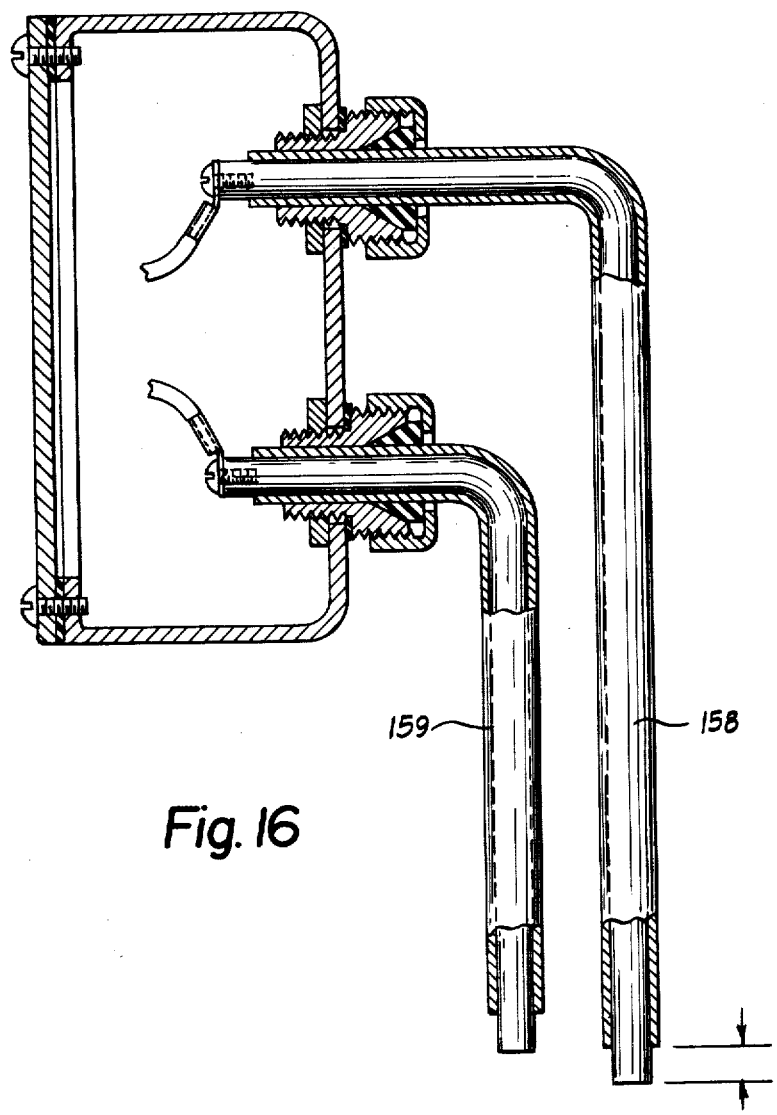
FIG. 16 shows an enlarged detail of the batter applicator probes used in FIG. 15.

Referring to FIG. 17, the electrical control circuit may be understood. Previous discussion has already placed safety switch 147, mix start push button 148, mode switch 149, hand mix or add water selector switch 150, and float selector switch 151 in side wall 146 of electrical control box 145. Located inside the electrical control box 145, but not shown in FIG. 7, are the level control relay 156 for batter applicator level, the control relay 155 for solenoids, and the "off" delay timer 157. The long probe 158 and the short probe 159 are located on the tempura batter applicator, FIGS. 15 and 16, to control operating level of batter therein. The water fill solenoid valve 62, the water dump solenoid valve 56, and the three hydraulic solenoid valves 140a, 140b, 140c have all been previously located. The cover switch 160 is located in the control box 145 so positioned that removal of the control box cover opens the switch 160, and the controls can not be operated with the cover open.

When starting operation of the tempura batter mixer, assuming that all switches 147, 148, 149, 150, 151 are in the "off" position, the machine operator would turn float selector switch 151 to position #1 or #2, to select a mix volume of water for one bag of dry mix or two bags of dry mix. Switch 151 is shown in position #2 in FIG. 17. He would then add either the one or two bags each of 50 pounds dry mix to hopper assembly 17, two bags with switch 151 in position shown. The operator should then ensure that water supply is available at 60 to the water supply solenoid valve 62, and that hydraulic oil pressure is available at main hydraulic valve 137. Manual-mix or add-water selector switch 150 should be in the "off" position shown in FIG. 17, and mode selector switch 149 should be turned to the "auto" position shown for automatic operation. The operator may now turn the safety switch 147 to the "on" position. The water solenoid valve 62 will immediately open, and water will fill the water tank 49 until the selected float switch 59 or 59a opens the electrical circuit when the predetermined level is reached. Henceforth, water filling is automatic.

When the water tank is filled, the operator presses mix start switch button 148. Power energizes timer 157 through line 161, energizing the timer to close contact 157a and to start the timer motor. Power then flows through line 162 through contact 157a to energize control relay 155. Control relay contact 155e closes to hold the timer energized when button 148 is released, timer 157 starts timing out, and contact 157a will remain closed for the present time, so that control relay 155 stays energized for the preset time. When the control relay 155 is energized, contact 155a opens so that no water can enter the water tank 49 during the timing cycle. Contact 155b closes to energize and open water dump valve 56 through line 163. Contact 155c closes to energize and open the hydraulic solenoid valve 140a through line 164 which supplies hydraulic power simultaneously to the mixer motor 106 and ram motor 64. Contact 155d closes to energize line 165 and open the hydraulic solenoid valve 140b which supplies hydraulic oil to the dry mix motor 37, and contact 155f in line 166 opens so that the transfer motor 128 can not run during the mix cycle. It may be seen that a preset volume/weight of water and a preset weight of dry mix are now being added to the mix pot 12, with the ram 80 orbiting and the mixer cage 94 rotating. The batch addition will usually be completed within thirty seconds, whereas the timer may be set for between forty-five and ninety seconds so that mixing continues for a short period of time after all batch components have been added. At the end of the preset time, the timer contact 157a opens to deenergize control relay 155. Immediately all contacts 155a, 155b, 155c, 155d, 155e and 155f return to the state shown in FIG. 17. With contact 155a closed, water will immediately, start to fill the water tank 49 for the next cycle. With contacts 155b, 155c and 155d open, the ram motor 64, mixer motor 106 and dry mix motor 37 all stop and water dump valve 56 closes. With contact 155f closed, the hydraulic solenoid valve 140c that controls the transfer assembly motor 128 is energized through contact 156a and the tempura batter starts to fill the tempura applicator, from transfer assembly chute 121. While the transfer assembly 28 is operating, the operator may refill the dry mix hopper 17 as he did previously. If the first mixed batch of tempura batter does not completely fill the batter applicator, the second batch may be made as soon as the water tank 49 is filled. The operator has only to push the mix start button 148 and the cycle repeats as previously described, during which the transfer assembly 28 does not operate because contact 155f must be open. At the end of the second cycle, the transfer assembly 28 again starts to operate and will continue until batter level in the batter applicator reaches the short probe 159 in the batter applicator. The probes 158 and 159, and the level control relay 156 are wired so that when the short probe 159 is grounded, as through batter, the normally closed contact 156a in level control relay 156 will open.

The transformer 161 in relay 156 between terminals 1 and 2 puts a secondary voltage on the probe 159, and limits the current available at the probes so that hazard to personnel is nil. The preferred voltage is 75 volts, with power maximum limited to 6 volt—amperes. The probes determine the variation in level in the batter applicator in FIG. 15. When batter first enters the applicator, the batter first touches the long probe 158. Nothing happens because no voltage is available at the long probe with contact 156b open, FIG. 17. As the level rises, it touches short probe 159, which is connected to one side of the transformer secondary winding. The other side of the secondary winding is attached to one side of the relay operating coil 156c, and the second side of relay operating coil is connected to ground. It may be seen that as the batter touches the short probe 159, it completes the low voltage circuit between ground and probe 159 and the relay coil 156c is energized. All contacts change in relay 156, so contact 156a opens and solenoid valve 140c is deenergized, stopping batter transfer to the applicator. Now, when the batter level falls below the short probe 159, the long probe 158 maintains the circuit through contact 156b, FIG. 17, which is closed. The relay coil 156c remains energized as long as the batter touches the long probe 158. When batter falls away from the long probe 158, the secondary transformer circuit is opened, the relay coil 156c is deenergized, and all contacts return again to the position shown in FIG. 17.

Contacts 3-4 in the relay 156 are standard contacts not used in this application. Other applications for this relay do require their use.

When contact 156a is open, no power can reach the solenoid valve 140c that controls the transfer assembly motor 128, so motor 128 can not run. The batter in the batter applicator already has reached long probe 158 by the time it reaches short probe 159, which means that long probe 158 is grounded before short probe 159, and that long probe 158 will remain grounded for a period of time after short probe is no longer grounded as batter is carried out of the batter applicator by passing product pieces. As the batter level in the applicator falls with use, usually one-eighth to one-quarter of an inch, the long probe will also become free of the batter surface, will lose its connection to ground through the batter, the contact 156a will close to furnish power to the solenoid valve 140c that furnishes oil to the transfer assembly motor 128 and more batter will enter the batter applicator from chute 121 on batter transfer assembly 28.

It may now be fully understood that the level control relay 156, associated with probes 158 and 159 will maintain the batter level in the batter applicator to within a small fraction of an inch, as long as batter is available at the transfer assembly suction point at 116 in FIG. 9. It may also be understood that normally the operator of the tempura batter mixer in this invention has only to reload the dry mix hopper assembly 17 after a mix cycle is complete, and then push a single mix start button 148 when the mixing tank 12 is nearly empty, to start another cycle. Water measurement and mixing cycle times for each batch are completely automatic. Dry mix measurement is solely a matter of putting the correct number of standard fifty pound bags of dry mix in the dry mix hopper 17 at the proper time. Both dry and wet components of the tempura batter are added to the mixing tank 12 in the same time period of about one-half minute while mixing proceeds, so that blending of components is continuous as they are added. In actual operation, total cycle time for adding components and finishing mixing is always less than ninety seconds and usually less than sixty seconds, so that rapid and thorough mixing has been attained. Transfer of mixed batter to the batter applicator is completely automatic, and on a demand basis, so that batter applicator level remains essentially constant. All objects of this invention have been attained.

A further discussion of some construction dimensions and component selection is in order at this time. It has been noted in the discussion of FIGS. 1, 8, 13 and 14 that the radius of the crank arms 69a and 73a is about one-fourth of the inside radius of mixing pot 12, while the extreme outside radius of the mixing cage 94 is somewhat less than three-fourths of the inside radius of mixing pot 12. This relationship is wholly arbitrary, but is well justified by good operation. A mixing motion combining the orbiting motion of the ram 80 and the rotation of the mixing cage 94 is desirable so that the shear elements of the mixing cage, consisting of corner posts 97 and rods 101, may pass through different volumes in the batter with successive revolutions of the cage 94, and each pass through any given volume is in a different manner. It is obvious that if the orbiting motion is reduced toward a zero radius, while cage radius is increased toward inside tank radius, that the volumes stirred by the shear elements of the cage approach closer to concentric annular rings, and mixing action suffers. Conversely, as orbiting radius is increased toward one-half the inside radius of the mixing tank and the cage radius is reduced toward one-half of the inside tank radius, there is progressively less overlap of mixing action in the central portion of the mixing tank, so that a single annular ring of varying consistency around the ring could result. The selected ratio of radii ensures that the central portion of the tank contents is well mixed with all other portions of the tank contents, which in turn ensures that the outer peripheral portion of the tank contents is essentially homogeneous throughout. The radius of the crank arms 69a and 73a could conceivably be between fifteen and thirty-five percent of the inside radius of the pot 12, as long as the sum of the crank arm radius and the maximum cage radius is a little less than the inside tank radius.

It has also been noted that each mixer cage face 96, 96a, 96b, 96c is essentially planar, with various elements forming the face. The faces are planar both for each of fabrication and so that mixing elements can be arranged at different radii from the mixer shaft 95. The corner posts are at a radius previously described. The rods 101 closest to the corner posts are at a shorter radius, and other rods 101 are at still shorter radii. The combination of different radii for different elements ensures a great multiplicity of mixing paths for the mixing elements, because no two elements of the same radius follow directly behind one another. This may be contrasted to a common type of mixing whip, which consists of a number of wires bent at the same radius, to form the surface elements of a near sphere. The volume mixed by the mixer cage of this invention is a true cylinder slightly smaller in radius than inside radius of the mixing tank. The scraper blade 105 ensures that all material in the mixing tank is swept into this volume.

It must be explained here that the described construction of each mixer cage face 96, 96a, 96b, 96c is for definite reasons. It has been stated that allowable mixing time for tempura batter is quite short, and that this invention successfully mixes such batter in a moderate fraction of that allowable time. To avoid over mixing, some of the mixing elements are omitted in approximately the bottom third of the mixing cage 94. The rods 101 only extend from the top member 98 in each face to the intermediate member 100. Thus, when the batter is drawn out of the mixing pot 12 by the transfer assembly 28 so as to leave room in the pot 12 for the next batch, the residual tempura from the previous batch will not be excessively stirred. However, some stirring is possible which blends the old batch with the new. This action is especially necessary when solid shortening, such as lard, is added in one lump at the beginning of a new batch. The vertical space on a mixer cage face 96, 96a, 96b, 96c which is unoccupied by rods 101 could probably be increased or decreased by twenty-five to forty percent without significantly affecting the mixing action.

It has been previously stated that the float switches 59 and 59a can control the water level in tank 49 at any point, and that such control insures that all water batches are equal. The actual accuracy of the switch action is plus or minus about one-fourth pound of water, so that total variation in water weight per batch is about one-half pound. This accuracy translates to plus or minus about 0.25% for a batch of one hundred pounds of water. In many cases, an accuracy of plus or minues 1.0% is acceptable.

As noted in the discussion of FIG. 17, the two float switches 59 and 59a can be set at different heights so that one can control water level in water tank 49 for a water batch nominally one hundred pounds for mixing with two bags of dry mix, and the other can be set for a fifty pound batch of water to be mixed with one bag of dry mix. The float switches 59 and 59a each consists of a hollow vertical stem closed at the bottom, a hollow doughnut float around the bottom of the stem free to move vertically a short distance, a magnetic reed switch contained in the stem, and a permanent magnet in the doughnut float. This is a standard switch manufactured by Madison Laboratories Inc. of Madison, Conn. As the float is raised by the water level, the magnet in the float moves away from the contacts and the contacts open. In the normal position in a dry water tank, the reed switch is closed by the magnet. The float stem and ball are all stainless steel construction and the reed switch is enclosed in a glass capsule. The tempura batter mixer in this invention was sized to mix a two bag batch because of known processing line requirements. As previously noted, up to 2,500 pounds of mixed batter per hour might be required for a single processing line. When about four minutes per batch is allowed for mixing and transfer, then fifteen batches per hour are possible. Simple division indicates that mixed batch size must be at least one hundred sixty-seven pounds, so the next multiple of fifty was chosen, resulting in a two hundred pound batch of mixed batter. However, near lunch break or shift end, a full batch may be more than is needed to complete a run, so the float selector switch 151 permits the mixing of a half size batch to finish the production run with a minimum waste.

During the discussion of FIG. 17, there was no mention of the need for mode selector switch 149 or mix/water selector switch 150. When the mode selector switch 149 is in the off position of FIG. 17, the level control relay 156 cannot function and the transfer assembly 28 can not operate. If the operator inadvertently forgets to fill the hopper assembly 17 before pushing the cycle start button 148, he can stop transfer of plain water to the tempura applicator by turning mode switch 149 to "off" while he is correcting his mistake. There may be other instances when no transfer is desired, and the control is available to stop transfer. An additional function, seldom used during operation is to manually transfer batter when desired. If selector switch 149 is turned to the "hand" position, level control relay 156 is bypassed and transfer assembly motor 128 will operate continuously. The main use for this feature is during cleaning of the machine, when the transfer assembly may be operated continuously while being flushed with water.

The normal operating position for manual mix, manual water selector switch 150 is the "off" position. However, there are several instances when a modified operation may be desired. For instance, if the operator inadvertently pushes the mix start button 148 before the water tank, FIG. 6, is properly filled, insufficient water will be added to the batch. This will be evident as the batch mixes. At the end of the mix cycle, he can turn switch 150 to the "water" position for an estimated time period, then to the "mix" position for a short time to correct the batch. This batch may not be exactly right, but the batch has been recovered and the processing line has not shut down. Another instance of "mix" use, as during cleanup, when mixer and orbiting can be operated continuously while the mix pot 12 is being flushed with water. A third use for the "mix" position is when for some reason a batch is obviously too thin. This may occur if a bag were well underweight, or if it were not fully emptied. A well trained operator would see the deficiency. He could then manually add an estimated amount of dry mix to the mixing tank and use the "mix" position on switch 150 to blend in the addition. Again, the batch may be a little inaccurate, but the processing line is not shut down.

A further discussion of operating variables is useful for complete understanding of the process of tempura batter mixing. It has been noted previously that the nominal ratio of water to dry mix is one to one on a weight basis. In practice, at various processing plants, and on various processing lines, the actual ratio may vary considerably. The dry mix is always added from fifty pound bags, which are usually very accurate in weight. But the water added to a batch may vary from as low as thirty-eight pounds of water per bag of mix up to about fifty-five pounds of water per bag, depending upon the end product desired. This variation in water to dry ratio will also affect the total mixing cycle time, which may vary from a minimum of about forty seconds up to sixty seconds. Short mixing time is associated with low water weight and long mixing time is associated with higher water weight. Another variable that affects the mixing time is the composition of the dry mix. The best mixing time for a given dry mix and a given end product must always be determined in the field through trial and error. Another variable which affects mixing time is the addition of solid or liquid shortening to a batch, the weight of such addition, and the temperature of solid shortening if added. Solid shortening may be added in a single chunk weighting 2.5 to 5.0 pounds per bag of dry mix, or an equivalent amount of liquid shortening may be added at essentially one time. Such additions of shortening may increase mixing time up to about ninety seconds.

It must be understood that the mixing times discussed above are also affected by the orbiting speed of the ram 80 and the rotational speed of the mixer cage 94. The infinitely variable speeds of hydraulically powered motors greatly facilitate speed adjustment for best mixing results and lowest mixing time. In each installation, the initial speed settings are twenty-five r.p.m. for the ram orbiting speed, and one hundred r.p.m. for the mixer cage. Ram speed may have to be increased to as high as forty r.p.m., especially if solid shortening is added to the mix. Above forty r.p.m. ram speed, the mixing action degenerates, so higher speeds are avoided. Solid shortening also requires a higher mixer cage speed, up to one hundred-fifty r.p.m. Above this speed, mixing is again adversely affected.

It may be readily seen from the above two paragraphs that the mixing of tempura batter can be a complex and demanding task when consistent results are required. The tempura batter mixer of this invention performs that task admirably.

In any installation of the tempura batter mixer, the over riding object, as previously mentioned, is to adequately and consistently mix the tempura in the shortest possible time. Not only does fast mixing avoid the degassification that can occur with long time mixing, but when mixing time is quite short, as with this invention, a short period of time is safely available to pump the tempura to the batter applicator without degradation. The pumping action in the preferred configuration of this invention is accomplished by the batter transfer assembly 28 as previously described. In many instances, a positive action lobe pump would also be satisfactory for use, especially if all batter in the mixing pot 12 were to be transferred within a few seconds. However, the batter transfer assembly 28 has the advantage that it stirs the batter very little, so that a pumping period which extends a little beyond the preferred maximum mixing time for the batter does not significantly degrade the batter.

The operating speed of the batter transfer assembly 28 must be determined in the field. Normal speeds of the screw shaft 124 are about three hundred to four hundred r.p.m. The faster speed is used for thinner tempura, or when the entire batch is transferred quickly to a holding tank, as when a holding tank supplies several applicators by gravity. Speed must be regulated to suit the particular installation of the tempura batter mixer.

It has been noted that both wet and dry components of tempura are added to the mixing tank at the same time, usually within thirty seconds. It may be further explained that the dry mix motor 37 should be regulated in speed so that the dry mix hopper 30 is emptied at the same time as the water tank 49. Thus, if a smaller amount of water is used for a mixed batch of tempura, the dry mix motor 37 must run at a faster speed. If the water batch is larger, the dry mix motor 37 should run at a slower speed. When component feed is regulated as described, continuous blending is facilitated and total mix time is reduced to the desired minimum.

It must be understood that a number of dimensions and components could be changed without affecting the spirit of this invention. The mixer could be a "three bagger." The drive motors could be variable speed electric motors. The water tank level switches could be any of a wide range of such units available commercially. The drive train could be gears or belts and pulleys rathern than sprockets and chains. The mixer cage could take many forms if they thoroughly mixed a batch quickly as described herein. The entire electrical control system could be revamped with different components. The dry mixer hopper assembly could be a vibrator feed or a screw feed hopper assembly. The batter transfer assembly could be redesigned in various ways. None of these should detract from the novelty of this invention.

What is claimed is:

1. In an apparatus for mixing batches of a liquid plus a finely divided dry solid, comprising a frame, a pot on said frame having an uninterrupted cylindrical side wall and a substantially closed bottom wall, means for adding premeasured quantities of said liquid and of said dry solid simultaneously to said pot quickly, a mixing cage having a plurality of planar faces meeting at angular corners and having a suspension shaft rigid therewith and centrally thereof, and suspended by said frame in said pot parallel to said cylindrical side walls, means on said frame for causing orbiting movement of said shaft within said pot, said orbiting movement causing said corners of said mixing cage to travel close to but not touching said cylindrical wall of said pot, and means on said frame to cause rotation of said shaft.

2. In an apparatus as defined in claim 1, a scraper blade mounted on said mixing cage in position to scrape said cylindrical wall of said pot repeatedly as said mixing cage moves in said pot.

3. In an apparatus as defined in claim 2, wherein said means for causing orbiting movement of said shaft comprises a rigid generally linear ram supported in said frame above the level of said pot for movement at right angles to the axis of said pot, two crank shafts laterally spaced along said ram, said crank shafts having parallel-ruler crank arms each having pivoted connections at its opposite ends, one connection of each arm being with a drive shaft and in line with a central diameter of said pot, the other connection of each arm being with said ram and on a line parallel to said first named line, and a variable speed motor driving said crank shaft.

4. In an apparatus as defined in claim 3, including vertically aligned bearings on an end of said ram over said pot, said suspension shaft carried in said bearings, and said means for driving said suspension shaft includes a variable speed motor.

5. In an apparatus as defined in claim 3, wherein the sum of the crank arm radius plus the maximum radius of any part of said mixing cage, is less than the inside radius of said mixing cage by a minor fraction of an inch.

6. In an apparatus as defined in claim 1, wherein said means for adding premeasured quantities of said liquid comprises a liquid tank supported near said frame above the top level of said pot and having a supply of liquid available under pressure, means for turning said supply on and off, means for measuring a predetermined level of liquid in said tank, and means for discharging all of the liquid in said tank, in a short time period, into the top of said pot.

7. In an apparatus as defined in claim 1, wherein said means for adding premeasured quantities of said dry solid comprises a hopper assembly close to said frame having walls and a flat bottom, an endless open-mesh wire conveyor belt has an operating run which passes along said flat bottom and a return run, said hopper assembly providing openings in the walls thereof for passage of said conveyor belt, and the discharge of said dry solid from said conveyor belt falling into said top of said pot.

8. In an apparatus as defined in claim 7, including a nose piece substantially semi-cylindrical in section fixed at a discharge end of said belt and of said flat bottom, said conveyor belt passing over said nose piece, whereby said dry solid passes over said nose piece.

9. In an apparatus as defined in claim 7, including a linear plastic scraper blade supported vertically at one corner post of said mixing cage in a slightly flexible manner.

10. In an apparatus as defined in claim 1, wherein said mixing cage is suspended by said suspension shaft with its bottom near the bottom of said pot, said cage has four planar faces equal in width, a sub-frame for said cage having coacting rigid vertical corner posts for said faces and a rigid top member for each face and struts from each corner post to said suspension shaft, and said shaft terminating flush with the bottom of said cage.

11. In an apparatus as defined in claim 10, including a plurality of parallel vertical mixing bars fixed on each of said planar faces and running from said top member downwardly.

12. In an apparatus as defined in claim 11, including intermediate support bars in each planar face parallel to said top member and between about 25 percent and about 40 percent of the height of said cage up from the bottom thereof, and at least some of said vertical mixing bars stopping at said intermediate support bars.

13. In an apparatus as defined in claim 1 used for mixing tempura batter, in combination with a batter applicator having a fairly constant desirable batter level.

14. In an apparatus as defined in claim 1, in combination a batter applicator for coating food product, and mechanical means for moving mixed batter from said mixing apparatus to said applicator.

* * * * *